(12) United States Patent
Floyd et al.

(10) Patent No.: US 6,201,095 B1
(45) Date of Patent: Mar. 13, 2001

(54) COLOR IMPROVEMENT OF DME-MELAMINE RESINS

(75) Inventors: William C. Floyd, Chester; Bernard F. North, Rock Hill, both of SC (US)

(73) Assignee: Omnova Solutions Inc., Fairlawn, OH (US)

( * ) Notice: Subject to any disclaimer, the term of this patent is extended or adjusted under 35 U.S.C. 154(b) by 0 days.

(21) Appl. No.: 09/338,219

(22) Filed: Jun. 22, 1999

(51) Int. Cl.[7] ............................. C08G 12/30; B32B 27/68
(52) U.S. Cl. ................... 528/254; 528/243; 528/245; 528/256; 528/266; 528/495; 525/491; 525/561; 428/425.3; 428/436; 428/502; 428/505
(58) Field of Search ..................................... 528/254, 243, 528/245, 256, 266, 495; 428/425.3, 436, 502, 505; 525/491, 501

(56) References Cited

U.S. PATENT DOCUMENTS

| | | |
|---|---|---|
| 3,420,799 | 1/1969 | Cavitt . |
| 4,481,116 | 11/1984 | Cabestany et al. . |
| 4,835,320 | 5/1989 | Blanc et al. . |
| 4,851,577 | 7/1989 | Chastrette et al. . |
| 4,854,934 | 8/1989 | Wilhelm et al. . |
| 4,968,774 | 11/1990 | Didier et al. . |
| 5,137,931 | 8/1992 | Okumura et al. . |
| 5,395,440 | 3/1995 | Trouve . |
| 5,539,077 | 7/1996 | Floyd . |
| 5,622,696 | 4/1997 | Camiener . |
| 5,665,851 | 9/1997 | Wilhelm et al. . |
| 5,691,426 | 11/1997 | Floyd . |
| 5,739,260 | 4/1998 | Floyd et al. . |
| 5,830,978 | 11/1998 | Floyd . |

FOREIGN PATENT DOCUMENTS

| | | |
|---|---|---|
| 514537 | 7/1955 | (CA) . |
| 341 537 | 5/1988 | (EP) . |

OTHER PUBLICATIONS

Non–Formaldehyde Thermosetting Technology by W.C. Floyd presented at INDA TEC '97 sponsored by INDA (Association of the Nonwoven Fabric Industry dated Sep. 8–10, 1997.

*Primary Examiner*—Duc Truong
(74) *Attorney, Agent, or Firm*—Robert F. Rywalski; Daniel J. Hudak

(57) ABSTRACT

A process is described for preparing a dialkoxyethanalamine derivative resin low in color by adding low amounts of formaldehyde to the reactants before acidification and heating. The reaction product is also claimed. The composition is useful in a variety of coating and overcoating applications where a brown, yellow or amber color would be aesthetically undesirable.

23 Claims, No Drawings

COLOR IMPROVEMENT OF DME-MELAMINE RESINS

FIELD OF INVENTION

The present invention relates to a dialkoxyethanal-melamine type resin that is lower in color, as measured by the Gardner color scale. The addition of a small amount of formaldehyde, relative to the dialkoxyethanal, before the reactants are acidified has been found to minimize the generation of color.

BACKGROUND OF THE INVENTION

Melamine-formaldehyde resins and phenol formaldehyde resins are known to give off formaldehyde in some applications. The emission of formaldehyde from these resins has become an issue as environmental concerns have been heightened. This has caused interest in non-formaldehyde or lower formaldehyde thermosetting resin technologies.

U.S. Pat. No. 5,539,077 discloses a resin composition which is the reaction product of an amine derivative chosen from melamine, glycolurile or their mixtures with a $C_1$ to $C_8$ dialkoxyethanal, the reaction product then being mixed and reacted with a polyol.

U.S. Pat. No. 5,691,426 discloses a binder comprising a mixture of a formaldehyde-based resin with a resin substitute comprising the reaction product of an amine derivative chosen from melamine, glycolurile or their mixtures with 1 or 2 moles of a $C_1$ to $C_8$ dialkoxyethanal, the reaction product being mixed, and preferably reacted, with a polyol. A paper entitled "Non-Formaldehyde Thermosetting Technology" by W. C. Floyd presented at INDA TEC '97 which is sponsored by INDA (Association of the Nonwoven Fabric Indrustry), discusses the benefits of blend technology of U.S. Pat. No. 5,691,426 in reducing the formaldehyde emissions while maintaining or improving properties of the blend as compared to formaldehyde based resins.

SUMMARY OF THE INVENTION

A resin composition low in color can be prepared by reacting an amine derivative selected from melamine, acetylene diurea and their mixtures with dialkoxyethanal and a small amount of formaldehyde. This can be further reacted with polyols and other components. Having the formaldehyde present in the mixture of the amine derivative and dialkoxyethanal prior to the time the pH is adjusted below 7 and heat is applied has been found to dramatically reduce the amount of color developed in the resin. Addition of the formaldehyde later in the process does not have the same effect on color development. As the resins from the reaction of amine derivatives with dialkoxyethanal are known to reduce or scavenge formaldehyde emissions from other resins, it is anticipated that the amount of formaldehyde emissions from this reaction product from the amine derivative, diethoxyethanal and a small amount of formaldehyde will be low. This reaction product can be formulated to act as a formaldehyde scavenger if mixed or reacted with formaldehyde containing resins.

DETAILED DESCRIPTION OF THE INVENTION

DME-melamine resins are typically manufactured by 1) reacting the dimethoxyethanal (DME) and melamine after adjusting to a pH of 9–9.5 at an elevated temperature (e.g. 60° C.) for a couple of hours, 2) adding one or more polyols, 3) then adjusting the pH to below 7 and reacting at an elevated temperature (e.g. 80–100° C.) for an hour or so, and 4) cooling and diluting with water. A problem with the DME-melamine resin is the development of a light to dark amber color in the resin during the final step of reacting at 80–100° C. at a pH below 7. On the Gardner color scale the values can range from about 5 or 6 to about 12 or more in the absence of formaldehyde. These colored resins are aesthetically unpleasing in certain applications where the resin is applied as a surface coating (e.g. wood coatings, overprint varnishes or the like). Bleaching of the amber resins is generally not satisfactory since it degrades the performance and introduces undesirable by-products.

It has unexpectedly been discovered that the addition of a small amount of formaldehyde, relative to the melamine, prior to the step of adjusting the pH to below 7 and heating to 80–100° C. results in dramatically reduced color. Generally the color is not apparent until heat is applied to the reaction mixture at a slightly acidic pH. More color is developed at reflux temperatures (90–99° C.) than at 80° C. It is preferable that the formaldehyde be present initially with the DME under alkaline pH conditions. Adding formaldehyde after the batch has been reacted under acidic conditions has little or no effect on color formation. The optimum amount of formaldehyde to add is a trade-off between adding more formaldehyde to obtain the lightest colored resin (up to 1 or 2 mole based on moles of melamine) and less (0.01, 0.05 or 0.1 moles based on moles of melamine) to reduce the free formaldehyde content.

The exact nature of the dark-colored chromophore is not known. The formation of color under conditions of acidic pH and high heat may be indicative of a dehydration of aldehyde-amino adduct (also known as a Schiff base or Imine) in which the aldehyde has an alpha-carbon containing a proton. Melamine formaldehyde resins are colorless under acidic conditions. The amine-aldehyde adduct in melamine-formaldehyde resin has no hydrogen on an alpha-carbon on the aldehyde portion. Glyoxal is known to cause severe (dark) color formation when reacted with melamine, or reacted up to 3–5% together with DME and melamine. DME is known to contain trace amounts of glyoxal (0.3% or less) and this is known to undergo a Cannnizarro reaction under alkaline conditions.

The exact nature of the compound being made is difficult to specify, and is best described as a reaction product of 1) an amine derivative, 2) dialkoxyethanal (e.g. DME), and 3) formaldehyde which is reacted together to provide a resin composition. Perhaps the resulting resin composition is one with a reduced number of residual primary amino groups on the melamine so as to have less available primary amino groups to react with an undetermined component of the dialkoxyethanal which forms the dark chromophore under dehydrating conditions of high temperature and acidic pH. An aldehyde containing a hydrogen on the alpha carbon reacted with a primary amine would form an imine type of structure (R—N=CH—CHR'R") when dehydrated. These imines are quite reactive and easily lead to color formation. This reaction product of an amine derivative, dialkoxyethanal and formaldehye is generally formed prior to addition of one or more polyols and the resinification (condensation to build molecular weight) at acidic pH.

Preferably this reaction is initially conducted at a pH above 7 and preferably above 8.0, 8.5 or 9.0 and below 9.5, 10.5 or 11 for a period of time (e.g. at least 5, 10, or 30 minutes) and desirably at an elevated temperature such as above 35° C., above 45° C., and preferably above 55° C. Desirably this reaction is substantially completed before the reaction product is acidified to a pH below 7.

The $C_1$–$C_8$ dialkoxyethanal is reacted with the amine derivative generally at a molar ratio of about 1 to about 6 equivalents of dialkoxyethanal to amine derivative and preferably at a ratio of about 1.5 or 2 to about 4.

The $C_1$–$C_8$ dialkoxyethanal generally has the following formula

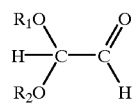

wherein $R_1$ and $R_2$ are $C_1$–$C_8$ alkyl or $R_1$ and $R_2$ are joined to form a 5 or 6 membered cyclic acetal group (i.e. $R_1$ and $R_2$ form a single linear or branched alkyl with 2–8 carbon atoms and with the —OCH—O— of the ethanal form a 5 or 6 member ring). Preferably $R_1$ and $R_2$ are a $C_1$–$C_8$ alkyl group, preferably the same group and preferably a methyl group as this is the most economical derivative which is commercially available, manufactured by Clariant.

The amine derivative may be any amine derivative reactive with formaldehyde to form amino resins. Preferably the amine derivative is melamine or acetylene diurea.

Desirably formaldehyde is present in amounts from about 0.01 to about 2 moles per mole of the amine derivative. More desirably formaldehyde is present from about 0.01, 0.05 or 0.1 to about 0.5 or moles per mole of the amine derivative.

When the reactants are acidified to a pH below 7, color can be generated. Desirably the pH is between 5 and 7 and more desirably between 6 and 7. Desirably the reaction temperature is above 35° C., and more desirably between 70 and 110° C., and preferably between about 80 and about 100° C. The reaction time can vary between 1 or 5 minutes and several hours.

In addition in some embodiment a polyol is present having 2 or more hydroxyl groups per molecule. It is desirably added after the reaction between the dialkoxyethanal and the amine derivative at the alkaline pH (above pH 7) reaction has gone nearly to completion. Suitable polyols include dialkylene glycol, polyalkylene glycol, glycerin, alkoxylated glycerin, polyvinyl alcohol, dextrose (and dextrose oligomers and derivatives), starch, starch derivatives, polyglycidol or polysaccharide (and derivatives). Preferred polyols are dipropylene glycol, diethylene glycol, triethoxylated glycerin, polyvinyl alcohol, enzyme converted starches and mixtures thereof. The polyol is desirably added in amounts from about 0.01 to about 4 moles per mole of said amine derivative and more preferably about 0.01 to about 2 moles per mole.

The resin may also include a hydrophobic modifier. Hydrophobic modifiers combine with the resin to provide suitable water resistance to the resin, i.e. improved resistance of the cured film to softening or dissolution by water. These are taught in U.S. Pat. No. 5,739,260 hereby incorporated by reference. The modifier preferably condenses with a reactive hydroxyalkylene group on the resin providing a hydrophobic group on one end of the resin molecule, which shields the resin from water penetration. This provides the resin with water resistance while still retaining film integrity and strength. The hydrophobic modifier is preferably a hydroxy, amino, or amido-functional compound containing a $C_6$–$C_{20}$ alkyl or aryl group. Suitable hydrophobic modifiers include ethoxylated glycerol monostearate, benzoguanamine, tetraethylene tetramine decanamide and the like. Generally about 0.1 to about 20, and preferably about 2 to about 5 weight percent of the modifier is added based on the dry weight of the resin composition.

The base used to raise the pH above neutral (pH 7) can be any base that does not interfere with the reactions of the amine derivative, dialkoxyethanal, formaldehyde, and polyols. Desirably the base is an alkaline metal hydroxide such as sodium hydroxide. Alternative bases include potassium hydroxide, and sodium carbonate.

Suitable acid catalysts for the reaction include sulfuric acid; hydrochloric acid; phosphoric acid; p-toluene sulfonic acid; and Lewis acids such as aluminum chloride, magnesium chloride, zirconium sulfate, zirconium lactate, zirconium citrate, zirconium chloride, and zinc chloride and the like. These catalysts facilitate the reaction(s) which effects the crosslinking. The acid catalyst is generally added in an amount of 0.1% to 15% preferably 1% to 10% based on the weight (dry basis) of the reaction product.

EXAMPLES

The following formulations (in grams) were reacted to form DME-melamine resins. These formulations vary in the amount of polyol used in the resin composition.

TABLE I

Varying the amount of Polyol

| Ingredient | Sample A | Sample B | Sample C |
| --- | --- | --- | --- |
| Dimethoxyethanal (DME) | 347 | 347 | 347 |
| Formaldehyde 50% in water | 60 | 60 | 60 |
| Melamine | 126 | 126 | 126 |
| 25% NaOH in water | 5.9 | 6.4 | 7.3 |
| Water | 74 | 400 | 200 |
| Acetic acid | 0.4 | — | — |
| Sulfuric Acid, 40% | — | 0.5 | 0.6 |
| Dipropylene glycol | — | 51 | 25.5 |
| Physical properties | | | |
| Solids | 53.3 | 33.8 | 66 |
| Viscosity, #3 spindle, 100 rpm | 160 | 60 | 190 |
| Gardner color | 1 | 1 | 1 |
| Free formaldehyde | 0.17% | 0.09% | 0.08% |

The DME (2 moles), melamine (1 mole), and formaldehyde (1 mole) were combined and heated to 60° C. The pH was raised to 9.0–9.5 with 25% sodium hydroxide and held under these conditions for 90 minutes. Sample A was cooled to 40° C. and diluted with water and its pH was adjusted to 6.5 with acetic acid. Samples B and C used different polyols, the pH was adjusted to 6.5 with 40% sulfuric acid and the batches were heated to 80° C. for 1 hour. The batches were cooled and the pH adjusted to 6.5–7.0. All three samples were clear, colorless, and water dilutable. By comparison, a commercially available water-based 1:3 molar ratio melamine-formaldehyde resin was found to contain 1.72% free formaldehyde. A comparable DME-melamine resin without formaldehyde has a Gardner color of 6 to 8.

The following formulations (in grams) were reacted as in the prior example and afforded clear, colorless resins. These formulations vary the ratio of the DME to the melamine (2:1, 1:1, and 1.5:1 mole:mole).

TABLE II

Varying amounts of DME

| Ingredient | Sample D | Sample E | Sample F |
| --- | --- | --- | --- |
| Dimethoxyethanal (DME) | 347 g | 174 g | 260 g |
| Formaldehyde 50% | 60 | 60 | 60 |
| Melamine | 126 | 126 | 126 |
| 25% NaOH | 5.4 | 1.8 | 1.9 |

TABLE II-continued

Varying amounts of DME

| Ingredient | Sample D | Sample E | Sample F |
|---|---|---|---|
| Sulfuric Acid, 40% | 0.4 | 0.2 | 0.2 |
| Glycerin triethoxylate | 38.5 | 25 | 25 |
| Dipropylene glycol | 25.5 | 12 | 12 |
| Water | 200 | 200 | 200 |
| Properties | | | |
| Solids | 42.2 | 44.8 | 45.4 |
| Viscosity, #3 spindle, 100 rpm | 800 | 460 | 1020 |
| Gardner color | <1 | <1 | <1 |
| Water dilutable | yes | yes | no |

The following formulation was run as described in the above examples. This table illustrates that a significantly less than stoichiometric amount of formaldehyde can prevent color generation in DME-melamine resins. The final product had a Gardner color of 1.5, viscosity of 160 cps (Brookfield #3 spindle, 100 rpm) and exhibited stability in excess of 3 months at room temperature. Such a colorless resin of low melamine substitution may be useful as a formaldehyde scavenger for melamine formaldehyde resins used in topical applications such as wood coatings or varnishes.

TABLE III

Formaldehyde Scavenging DME-Melamine Resin

| Ingredient | Sample G |
|---|---|
| Dimethoxyethanal (DME) | 305 g |
| Formaldehyde 50% | 6 |
| Melamine | 126 |
| 25% NaOH | 4.3 |
| Sulfuric Acid, 40% | 0.2 |
| Glycerin triethoxylate | 25 |
| Dipropylene glycol | 12 |
| Water | 200 |

The following series of reactions (shown in Tables IV A, B, and C) were run using DME in a 2:1, 3:1, and 4:1 molar ratio with melamine. Diethylene glycol was used as the polyol. Formaldehyde was incorporated in the initial reactor charge at molar ratios of 0.0, 0.22, 0.67, and 1.0 with respect to the melamine. The ingredients were combined, pH adjusted to 9.0 with 25% sodium hydroxide and heated to 95° C. for 4 hours. As general trends, it was found that as formaldehyde content increased, viscosity increased and Gardner color decreased. The resins with lower DME:melamine ratios (Table IV A) showed greater viscosities with increasing formaldehyde component than resins with higher DME:melamine ratios (Tables IV B and C). There was little difference in color between resins having 0.67 moles of formaldehyde (Samples J, N, and S) and those with 1.0 moles (Samples K, O, and T) under these conditions. While the reaction protocol did not include an acidic condensation step it was observed that the pH had decreased to about 6.0 over the course of the reaction.

TABLE IV

A Effect of Varying the Formaldehyde Amount

| Ingredient | Sample H | Sample I | Sample J | Sample K |
|---|---|---|---|---|
| Dimethoxyethanal (DME) | 170 g | 170 | 170 | 170 |
| Formaldehyde 50% | 0 | 10 | 20 | 30 |
| Melamine | 63 | 63 | 63 | 63 |
| DEG | 100 | 100 | 100 | 100 |
| Physical Properties | | | | |
| Viscosity | 400 | 955 | 910 | >10,000 |
| Colour | 12 | 10 | 5 | 4 |

TABLE IVB

Effect of Varying the Formaldehyde Amount

| Ingredient | Sample L | Sample M | Sample N | Sample O |
|---|---|---|---|---|
| Dimethoxyethanal (DME) | 250 | 250 | 250 | 250 |
| Formaldehyde 50% | 0 | 10 | 20 | 30 |
| Melamine | 63 | 63 | 63 | 63 |
| DEG | 100 | 100 | 100 | 100 |
| Physical Properties | | | | |
| Viscosity | 210 | 455 | 490 | 505 |
| Colour | 12 | 10.5 | 6 | 5 |

TABLE IVC

Effect of Varying the Formaldehyde Amount

| Ingredient | Sample P | Sample Q | Sample R | Sample S | Sample T |
|---|---|---|---|---|---|
| Dimethoxyethanol DME) | 340 | 340 | 340 | 340 | 340 |
| Formaldehyde 50% | 0 | 5 | 10 | 20 | 30 |
| Melamine | 63 | 63 | 63 | 63 | 63 |
| DEG | 100 | 100 | 100 | 100 | 100 |
| Physical Properties | | | | | |
| Viscosity | 190 | 200 | 210 | 225 | 250 |
| Colour | 11.5 | 12 | 10 | 6 | 5 |

The following examples (shown in Table V) show the visual effect of adding formaldehyde at different points in the reaction process. These examples use 0.1 moles of formaldehyde with 1.0 mole of melamine and 2.75 moles of DME. The amount of formaldehyde is much less than stoichiometric.

TABLE V

Effect of When the Formaldehyde Was Added

| Ingredient | Sample U | Sample V | Sample W |
|---|---|---|---|
| Dimethoxyethanal (DME) | 303 | 303 | 303 |
| Formaldehyde 50% and time added | 6 Added initially | 6 Added after acidification | 6 Added 1 hr after acidification |
| Melamine | 126 | 126 | 126 |
| Ethox PGW | 50 | 50 | 50 |
| dipropylene glycol (DPG) | 35 | 35 | 35 |
| Water | 140 | 140 | 140 |
| Colour (before acidification) final | (2) 7 | (2) 9 | (2) 15 |

*Ethox PGW is glycerine reacted with 3 equivalents of ethylene oxide and is available from Ethox Corp in Greenville, S.C.

In Sample U a I-liter flask was charged DME, formaldehyde, and melamine. This was stirred and heated to 60° C. and the pH was adjusted to 9.0–9.5 with 25% sodium hydroxide. The pH was maintained in this range at 60° C. for 2 hours. The melamine dissolved and afforded a clear solution. After the 2 hour period, the Ethox PGW and DPG were added. A sample drawn at this point had a Gardner color of 2 and was clear and colorless in appearance. The pH was lowered to 6.5 with 40% sulfuric acid. The batch was heated to reflux (99° C.) for 1 hour. Dilution water was added and the batch was cooled to 35° C. A sample drawn at this time had a Gardener color of 7 (pale amber in appearance).

In Sample V in a like manner as above the DME, but not formaldehyde, was charge to a 1-liter flask followed by melamine. This was stirred and heated to 60° C. as above. The pH was adjusted to 9.0–9.5 and the batch was maintained in this state for 2 hours. The Ethox PGW and DPG were charged. A sample drawn for Gardner color at this point was clear and colorless having a Gardener color of 2. The pH was lowered to 6.5, the formaldehyde was added, and the batch was heated to reflux for 2 hour. Dilution water was added and the batch was cooled to 35° C. A sample drawn at this time had a Gardner color of 9 and was clear amber in appearance.

In Sample W, as in the immediate above example, the DME and melamine were combined and reacted at 60° C. with a pH of 9.0–9.5 for 2 hours. PGW and DPG were charged. No formaldehyde has been added at this point. A sample drawn for Gardener color at this time had a Gardner color of 2. The pH was lowered and the batch was refluxed for 1 hour. A sample drawn after the 1-hour reflux had a Gardner color of 13 (dark brown in appearance). The formaldehyde and dilution water were added and reflux continued for 1 hour. A final sample had a Gardner color of 15 and was very dark brown in appearance. The additional hour of reflux caused the product to lose some of its water solubility.

These results show that color generation generally does not occur until heat is applied to the reaction mixture at a slightly acid pH. More color is generated at reflux temperature (90–99° C.) for the last acidic condensation than at 80° C. The presence of a small amount of formaldehyde when the pH is lowered (made acidic) has a demonstrable effect on color formation in the subsequent reaction process. It seems preferable that the formaldehyde be present initially with the DME under alkaline conditions. Adding the formaldehyde after the batch has been reacted under acidic conditions has little or no effect on color formation. Longer reaction times under acidic conditions to allow the formaldehyde time to further react only makes matters worse in terms of color and resin solubility.

The formulation used here is based on that for a "scavenging" type of DME-melamine resin designed to scavenge formaldehyde from thermosetting resins such as phenol-formaldehyde or melamine-formaldehyde resins. Such a scavenging resin would react with the formaldehyde thermoset in much the same sequence as the resin in Example W above probably functioned to scavenge the extra formaldehyde added after acidification. The formaldehyde scavenging by the resin would have no effect on the color of the resin.

In the reaction processes above, the DME reacts with the melamine under conditions of alkaline pH. Formaldehyde is also known to react with melamine under alkaline conditions.

The formation of color under conditions of acidic pH and high heat is indicative of a dehydration of an aldehyde-amino adduct in which the aldehyde has a hydrogen attached to an alpha-carbon. Melamine-formaldehyde resins (MF) are colorless under acidic conditions. The amine-aldehyde adduct in MF resins has no hydrogen on an alpha carbon on the aldehyde portion. Glyoxal is known to cause severe color formation when reacted with melamine, or when reacted up to 3–5% together with DME and melamine. The exact nature of the dark-colored chromaphore is not known but characteristics may be surmised.

The compositions of this disclosure are useful as part or all of coatings for graphic applications, water resistant coatings, coatings over printed surfaces, or catalytic overprint varnishes including over substrates such as metal (e.g. aluminum foil), polyester, fiberglass, polyethylene, cellulosics (e.g. paper), polypropylene, etc.

While in accordance with the Patent Statutes, the best mode and preferred embodiment have been set forth, the scope of the invention is not limited thereto, but rather by the scope of the attached claims.

What is claimed is:

1. A resin composition low in color comprising the reaction product of:
   a) an amine derivative selected from melamine, acetylene diurea and mixtures thereof;
   b) from about 1 to about 6 moles of a dialkoxyethanal per mole of said amine derivative, wherein the dialkoxy of said dialkoxyethanal is selected from two alkoxys, independently, having from 1 to 8 carbon atoms or comprise a 5 or 6 member cyclic acetal group;
   c) from about 0.01 to about 2 moles of formaldehyde per mole of said amine derivative,
   said a), b), and c) being reacted under basic conditions at a pH above 7;
   d) optionally including from about 0.01 to about 4 moles of a polyol per mole of said amine derivative, said polyol having 2 or more hydroxyl groups per molecule; and
   including further reaction under acidic conditions at a pH below 7.

2. A resin according to claim 1, wherein the amount of said dialkoxyethanal is from about 1.5 to about 4 moles, per mole of said amine derivative, and wherein said a), b) and c) are reacted under basic conditions at a pH above 8.

3. A resin according to claim 1, wherein the amount of said formaldehyde is from about 0.1 to about 1 mole, per mole of said amine derivative.

4. A resin according to claim 2, wherein the amount of said formaldehyde is from about 0.1 to about 1 mole, per mole of said amine derivative.

5. A resin according to claim 3, wherein said a), b) and c) are reacted under basic conditions at a pH above 9.0, including said polyol wherein said polyol is added at said high pH after said a), b) and c) reaction, and subsequently reacted at said pH below 7 wherein the polyol is comprised of dialkylene glycol, polyalkylene glycol, glycerine, alkoxylated glycerin, polyvinyl alcohol, dextrose, dextrose oligomers, polysaccharide, polysaccharide derivatives, starch, starch derivatives, or polyglycidol or their mixtures.

6. A resin according to claim 3, wherein said resin includes from about 0.1 to about 20 weight percent of a hydrophobic modifier.

7. A resin according to claim 3, wherein said a), b) and c) are reacted under basic conditions at a pH above 9.0, including said polyol wherein said polyol is added at said high pH after said a), b) and c) reaction and subsequently reacted at said pH below 7 wherein said polyol comprises diethylene glycol, dipropylene glycol, triethoxylated glycerin, enzyme-converted starch, or polyvinyl alcohol, or mixtures thereof.

8. A resin according to claim 6, wherein said hydrophobic modifier comprises ethoxylated glycerol monostearate, benzoguanamine, or tetraethylene tetramine decanamide wherein said a), b) and c) are reacted under basic conditions at a pH above 9.0, including said polyol wherein said polyol is added at said high pH after said a), b) and c) reaction, and subsequently reacted at said pH below 7.

9. A process for forming a resin with little color from dialkoxyethanal and an amine derivative, said process comprising;
   a) reacting at a pH above 7;
      1) an amine derivative selected from melamine and acetylene diurea and mixtures thereof;
      2) from about 1 to about 6 moles of a dialkoxyethanal per mole of said amine derivative, wherein said dialkoxy is selected from alkoxys of 1 to 8 carbon atoms or comprise a 5 or 6 membered cyclic acetal group;
      3) from about 0.01 to about 2 moles of formaldehyde per mole of said amine derivative; and
      4) optionally from about 0.01 to about 4 moles of a polyol per mole of said amine derivative, said polyol having 2 or more hydroxyl groups per molecule, and
   b) lowering the pH below 7 and further reacting the components.

10. A process according to claim 9, wherein the amount of said dialkoxyethanal is from about 2 to about 4 moles, and wherein the reaction of step a) is performed at a pH above 8.0.

11. A process according to claim 9, wherein the amount of said formaldehyde is from about 0.01 to about 1.0 moles.

12. A process according to claim 10, wherein the amount of said formaldehyde is from about 0.01 to about 1.0 moles.

13. A process according to claim 10, wherein the optional polyol is present and is selected from dialkylene glycol, polyalkylene glycol, glycerine, alkoxylated glycerin, polyvinyl alcohol, dextrose, dextrose oligomers, polysaccharide, polysaccharide derivatives, starch, starch derivatives, polyglycidol and their mixtures.

14. A process according to claim 10, wherein said resin includes from about 0.1 to about 20 weight percent of a hydrophobic modifier.

15. A process according to claim 10, wherein said polyol is present and comprises diethylene glycol, dipropylene glycol, triethoxylated glycerin, enzyme-converted starch, dextrose, dextrose oligomers or polyvinyl alcohol, or mixtures thereof, and wherein the reaction of step a) is performed at a pH above 9.0, including said polyol and adding said polyol at said high pH after substantial reaction of said a), b) and c), and reacting said polyol at said low pH.

16. A process according to claim 14, wherein said hydrophobic modifier comprises ethoxylated glycerol monostearate, benzoguanamine, or tetraethylene tetramine decanamide.

17. In a process for forming a resin from dialkoxyethanal and an amine derivative selected from melamine and acetylene diurea and their mixtures including reacting said dialkoxyethanal and said amine derivative at a pH above 7 to form an adduct and thereafter reacting the adduct at a pH below 7, the improvement comprising adding from about 0.01 to about 2.0 moles of formaldehyde per mole of amine derivative to said dialkoxyethanal and amine derivative prior to or during the reaction at a pH above 7 so that undue color is not added during the reaction at a pH below 7.

18. In a process according to claim 17, wherein the amount of formaldehyde is from about 0.05 to about 1.0 mole per mole of amine derivative.

19. In a process according to claim 18, further including a step of co-reacting a polyol having 2 or more hydroxyl groups with, the reaction product of said amine derivative, said dialkoxyethanal, and said formaldehyde.

20. A composite article comprising:
   a substrates; and
   a reaction product of a composition comprising:
      a) an amine derivative selected from melamine, acetylene diurea and mixtures thereof;
      b) from about 1 to about 6 moles of a dialkoxyethanal per mole of said amine derivative, wherein said dialkoxy is selected from two alkoxys independently, having from 1 to 8 carbon atoms or comprise a 5 or 6 membered cyclic acetal group; and
      c) from about 0.01 to about 2 moles of formaldehyde per mole of said amine derivative,
      said a), b) and c) being reacted for at least 5 minutes at a temperature above 35° C. with sufficient base to achieve a pH above 7,
      d) optionally including in said composition from about 0.01 to about 4 moles of a polyol per mole of said amine derivative, said polyol having 2 or more hydroxyl groups per molecule; and
   further reacting said composition at a pH below 7 for at least 5 minutes at a temperature above 35° C.

21. A composite according to claim 20, wherein the substrate is a cellulosic, fiberglass, or polyester substrate, and wherein said a), b) and c) are reacted under basic conditions at a pH above 8.

22. A composite according to claim 20, further including either as a separate component or blended with said reaction product a melamine-formaldehyde resin.

23. A composite according to claim 22, wherein the substrate is a cellulosic, fiberglass, or polyester substrate, and wherein said a), b) and c) are reacted under basic conditions at a pH above 9.0.

* * * * *